(12) United States Patent
Hilliard

(10) Patent No.: US 11,091,250 B2
(45) Date of Patent: Aug. 17, 2021

(54) TELESCOPIC DEVICE

(71) Applicant: SAFRAN LANDING SYSTEMS UK LTD, Gloucester (GB)

(72) Inventor: Matthew Hilliard, Gloucester (GB)

(73) Assignee: Safran Landing System UK LTD

(*) Notice: Subject to any disclaimer, the term of this patent is extended or adjusted under 35 U.S.C. 154(b) by 342 days.

(21) Appl. No.: 16/117,823

(22) Filed: Aug. 30, 2018

(65) Prior Publication Data

US 2019/0071170 A1 Mar. 7, 2019

(30) Foreign Application Priority Data

Sep. 5, 2017 (EP) .................................... 17189451

(51) Int. Cl.
*B64C 25/60* (2006.01)
*F15B 15/14* (2006.01)
(Continued)

(52) U.S. Cl.
CPC .............. *B64C 25/60* (2013.01); *B64C 25/58* (2013.01); *F15B 15/1428* (2013.01);
(Continued)

(58) Field of Classification Search
CPC ......... B64C 25/60; B64C 25/58; F16C 29/02; F16C 33/046; F16C 17/022; F16C 43/02; F15B 15/1442; F15B 15/1461
See application file for complete search history.

(56) References Cited

U.S. PATENT DOCUMENTS 2,670,816 A * 3/1954 Armstrong .............. F16F 9/366
188/322.17
4,909,638 A * 3/1990 Muto ...................... F16C 43/02
384/273
(Continued)

FOREIGN PATENT DOCUMENTS

DE 1866121 U 1/1963
EP 1993907 B1 12/2010
(Continued)

OTHER PUBLICATIONS

Extended European Search Report for European Application No. 17 189 451.2, dated Feb. 26, 2018—7 pages.
(Continued)

*Primary Examiner* — Richard R. Green
*Assistant Examiner* — William L Gmoser
(74) *Attorney, Agent, or Firm* — RatnerPrestia

(57) ABSTRACT

A telescopic device having a housing and a rod is slidably mounted within a bore of the housing. First and second bearings provide sliding engagement between the rod and the housing. The first bearing is mounted relatively close to the open end of the bore and the second bearing is mounted relatively far from the open end of the bore relative to the first bearing. The second bearing is annular in shape with a central axis, the bearing has a radially outer mounting surface of arcuate cross-section and a radially inner bearing surface for sliding engagement with an outer surface of the rod and wherein the inner sidewall is provided with an annular groove having a second mounting surface of arcuate cross-section to house and retain the second bearing.

21 Claims, 3 Drawing Sheets

(51) Int. Cl.
*F16F 9/36* (2006.01)
*B64C 25/58* (2006.01)
*F16C 29/02* (2006.01)
*F16C 33/04* (2006.01)
*F16F 9/32* (2006.01)
*F16F 9/34* (2006.01)
*F16F 9/06* (2006.01)

(52) U.S. Cl.
CPC ...... *F15B 15/1433* (2013.01); *F15B 15/1442* (2013.01); *F15B 15/1471* (2013.01); *F16C 29/02* (2013.01); *F16C 33/046* (2013.01); *F16F 9/06* (2013.01); *F16F 9/3214* (2013.01); *F16F 9/3235* (2013.01); *F16F 9/34* (2013.01); *F16F 9/36* (2013.01); *F16F 9/366* (2013.01); *F16C 2361/53* (2013.01); *F16F 2226/04* (2013.01)

(56) References Cited

U.S. PATENT DOCUMENTS

| | | | | |
|---|---|---|---|---|
| 5,148,896 | A * | 9/1992 | Ralph | B64C 25/60 188/314 |
| 7,461,902 | B1 * | 12/2008 | Darst | E21C 25/58 299/67 |
| 2010/0181423 | A1 * | 7/2010 | Martin | B64C 25/60 244/104 FP |
| 2013/0064490 | A1 * | 3/2013 | Brock, II | C23C 4/02 384/625 |
| 2013/0208869 | A1 * | 8/2013 | Onken | F16C 23/04 378/132 |
| 2015/0016760 | A1 * | 1/2015 | Tanaka | F16C 33/1065 384/120 |
| 2015/0041268 | A1 * | 2/2015 | Luce | B64C 25/60 188/316 |
| 2015/0059184 | A1 * | 3/2015 | Barth | F16C 33/046 29/898.054 |
| 2015/0292563 | A1 * | 10/2015 | Polanco | F16C 41/04 384/276 |
| 2015/0330445 | A1 * | 11/2015 | Kamiya | F16C 33/201 384/297 |
| 2015/0367933 | A1 * | 12/2015 | Li | F16F 9/0209 701/3 |
| 2016/0052536 | A1 * | 2/2016 | Nicolussi | B62D 1/185 384/441 |
| 2016/0333926 | A1 * | 11/2016 | Cislo | F16C 33/10 |
| 2017/0146065 | A1 * | 5/2017 | Danowski | F16C 17/10 |
| 2017/0307005 | A1 * | 10/2017 | Ejakov | F16C 9/04 |
| 2018/0216668 | A1 * | 8/2018 | Dickinger | F16C 35/02 |

FOREIGN PATENT DOCUMENTS

| | | | |
|---|---|---|---|
| EP | 3192737 | A1 | 7/2017 |
| EP | 3279086 | A1 | 2/2018 |
| FR | 1249285 | A | 11/1960 |
| GB | 553067 | A * | 5/1943 ............ F16C 23/045 |

OTHER PUBLICATIONS

Macy et al., "Titanium Matrix Composite Landing Gear Development", Aerospace Technology Conference and Exposition, Anaheim, CA, Sep. 25-28, 1989, downloaded Aug. 14, 2018—12 pages.

* cited by examiner

TELESCOPIC DEVICE

This application claims the benefit of and priority to European Application EP 17189451.2, filed on Sep. 5, 2017, the contents of which are incorporated herein by reference.

BACKGROUND

A telescopic device is a device that creates motion in a straight line. Telescopic devices can be used in a range of applications, including shock absorbers for aircraft landing gear.

A telescopic device can include a housing and a rod which is slidably mounted to linearly translate relative to the housing along a longitudinal axis between an extended position, where the telescopic device is relatively long, and a retracted position, where the telescopic device is relatively compressed. Where a telescopic device is actively or passively biased by fluid pressure, the rod can include a piston at the end located within the housing, which will be referred to as the 'internal end' of the rod, thereby defining a piston and rod assembly.

The term telescopic device as used herein covers both active telescopic devices, which are driven by a power source to extend or retract, and also passive telescopic devices such as shock absorbers which contain spring means to bias the telescopic device to extend and/or retract.

A telescopic device can include first and second discrete bearings, each arranged in sliding engagement with one of the housing and rod to constrain relative movement between the piston and housing to the longitudinal axis, while also limiting friction between the rod and housing. The first bearing is generally located near the end of the housing from which the rod extends. The second bearing is generally located within the housing, spaced from the first bearing to stabilize the internal end of the rod as it moves.

In many applications it is desirable for the mass of a telescopic device to be minimized. Given that the housing is often the component of greatest mass, it is known to form some or all of the housing from a lightweight material such as titanium or aluminum. In such cases, it can be advantageous for the second bearing to act upon the rod rather than being mounted on the rod to act against an inner surface of the housing, in order to prevent wear of the material from which the housing is formed. This type of second bearing will be referred to as an 'inward facing' second bearing.

The present inventor has devised a new inward facing second bearing arrangement that can lead to a telescopic device of reduced mass, improved lifespan and/or reduced maintenance requirement.

This description of the background is provided to assist with an understanding of the following explanations of exemplary embodiments, and is not an admission that any or all of this background information is necessarily prior art.

SUMMARY

In accordance with a first aspect of the invention, there is provided a telescopic device according to claim 1.

Thus, a telescopic device according to the first aspect includes a second bearing mounted in an arcuate section annular recess, which serves to hold the second bearing in place and also permits rotation of the second bearing relative to the housing to accommodate flexing of the internal end of the rod in use. This can result in a telescopic device of reduced mass, improved lifespan and/or reduced maintenance requirement when compared to prior art arrangements.

According to a second aspect of the invention, there is provided a method of manufacturing a telescopic device according to claim 13.

Optional features of the first and second aspects are set out in the dependent claims.

DETAILED DESCRIPTION

Figure 1:
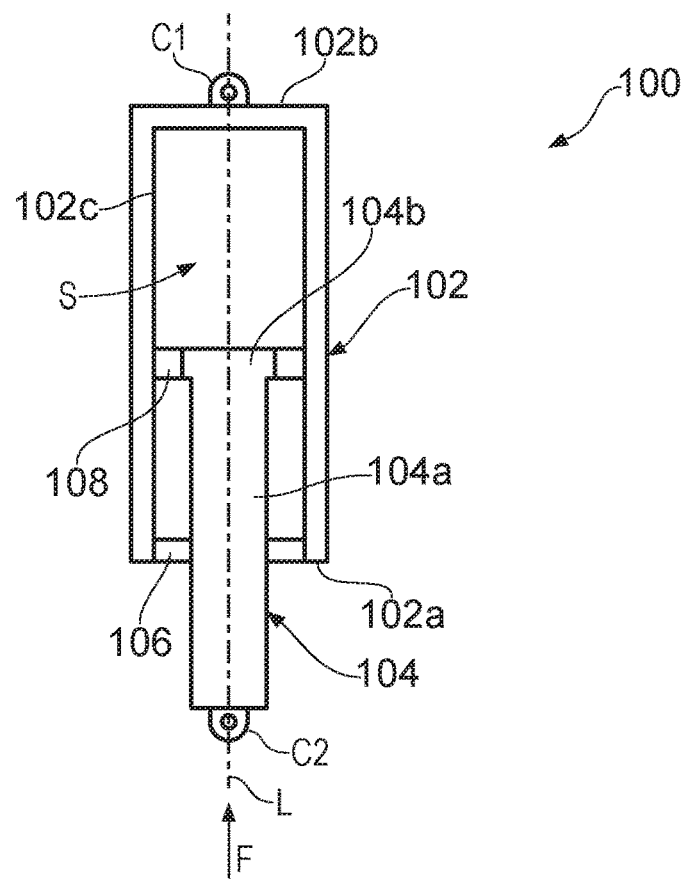
FIG. 1 is a schematic diagram of a known type of telescopic device.

FIG. 1 shows a known type of telescopic device 100 including a housing 102 and a piston and rod assembly 104, which for brevity will be referred to as the rod 104, which can linearly translate relative to the housing 102 along a longitudinal axis L between an extended position, where the telescopic device 100 is relatively long, and a retracted position, where the telescopic device is relatively compressed.

The telescopic device 100 is a shock absorber which contains spring means such as a mechanical spring or compressible fluid in a spring chamber S. As such, the telescopic device 100 has a default extended state and can be compressed by an external force F against the spring bias to compress the telescopic device 100.

The telescopic device 100 has a first coupling formation C1, such as a plate like lug or a plurality of parallel, plate like lugs which extend from the housing 102 and define one or more coaxial holes for pivotally coupling the housing 102 to a mounting structure such as a vehicle body (not shown). Many other types of coupling formation can be provided and will be apparent to the skilled person, such as rigid coupling formations, or other types of movable coupling formations. The telescopic device 100 also has a second coupling formation C2 for coupling the housing 102 to a second, structure (not shown) such as a part to be moved or, in the context of a vehicle, a wheel assembly for example.

In this example the housing 102 is generally cylindrical in shape with an open end 102a defining a bore and a closed end 102b. The rod 104 has an elongate cylindrical rod 104a with a radially enlarged piston head 104b. The housing 102 and rod 104 together define a variable sized internal chamber. The chamber in this example contains oil and a gas, such as nitrogen. When the telescopic device 100 is compressed, the chamber volume decreases, compressing the gas and forcing oil through a first damping orifice in order to provide compression damping. The compressed gas serves as a spring, biasing the telescopic device 100 to extend following removal of the compressive force. Recoil damping is provided by the oil passing through a second damping orifice, which can be in the annulus between the housing 102 and rod 104.

A first ring bearing 106 is located within the bore, within the annulus near the open end 102a of the housing 102 and arranged in sliding engagement with the outer sidewall of the cylindrical piston rod 104a. A second ring bearing 108 is mounted on the rod 104b and arranged in sliding engagement with the inner sidewall of the cylindrical housing body 102c to stabilize the end of the rod 104 within the housing as it moves. Thus, the bearings 106, 108 serve to constrain relative movement between the rod 104 and housing 102 to the longitudinal axis L while also limiting friction between the rod 104 and housing 102.

In many applications it is desirable for the mass of a telescopic device to be minimized. Given that the housing is often the component of greatest mass, it is known to form some or all of the housing from a lightweight material such as titanium or aluminum. In such cases it can be advantageous for the second bearing 108 to act upon the piston, rather than being mounted on the piston to act against an inner surface of the housing, in order to reduce or prevent wear of the material from which the housing is formed. This type of second bearing will be referred to as an 'inward facing' second bearing.

Figure 2:
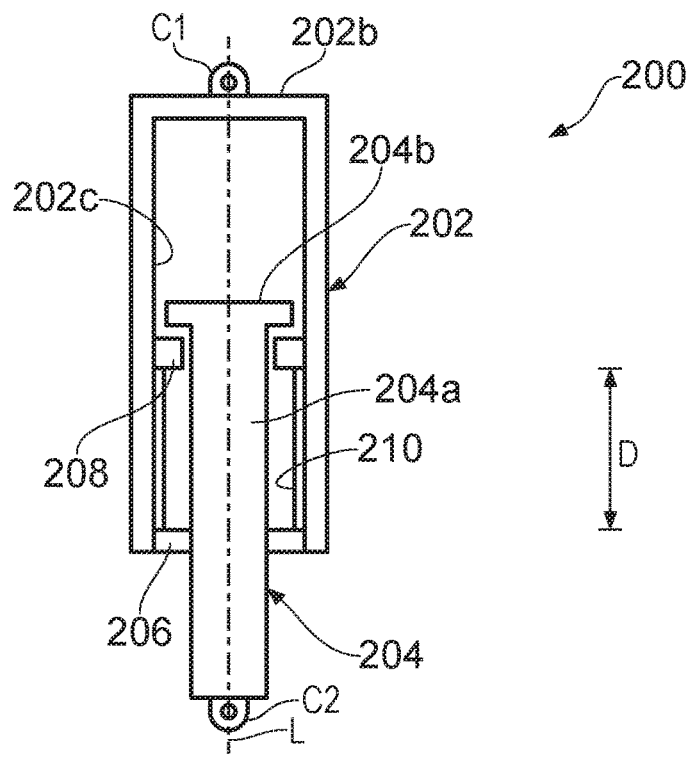
FIG. 2 is a schematic diagram of another known type of telescopic device.

FIG. 2 shows a known type of telescopic device 200 having an inward facing second bearing. The telescopic device 200 is similar to the telescopic device 100 of FIG. 1 except that the second bearing 208 is mounted within the bore of the housing 202 and arranged in sliding engagement with the outer sidewall of the cylindrical piston rod 204a in an analogous manner to the first bearing 206.

The second bearing 208 is spaced from the first bearing 206 by a distance D sufficient to enable the telescopic device 200 to extend and contract fully with the piston 204 supported by the second bearing 208.

In use, the bearings 206, 208 generally do not rub against the inner sidewall 202c of the housing 202, which defines the bore, meaning that the inner sidewall 202c can be formed from bare i.e. un-coated and un-plated titanium, aluminum or the like without concern of degradation of the inner sidewall 202c due to sliding contact with the upper bearing 208.

The piston head 204b can be radially larger than the rod 204a so as to serve as an out stop against the second bearing 208. Alternatively, a separate out stop formation can be provided such as an inner rod which extends into the bore from the closed top of the housing and enters a bore within the piston, the piston and inner rod being provided with engagement formations which comes into contact to limit movement of the piston along the longitudinal axis L.

The second bearing 208 is attached to a cylindrical spacer or collar 210 located within the annulus between the housing 202 and piston 204. The spacer 210 is in turn attached to the first bearing 206. Alternatively, the second bearing 208 can be attached to the inner sidewall 202c of the housing 202 by way of mating engagement features.

The present inventor has devised a new type of telescopic device with an inward facing second bearing that can lead to a telescopic device of reduced mass, improved lifespan and/or reduced maintenance requirement in comparison to the telescopic device 200 of FIG. 2.

Figure 3:
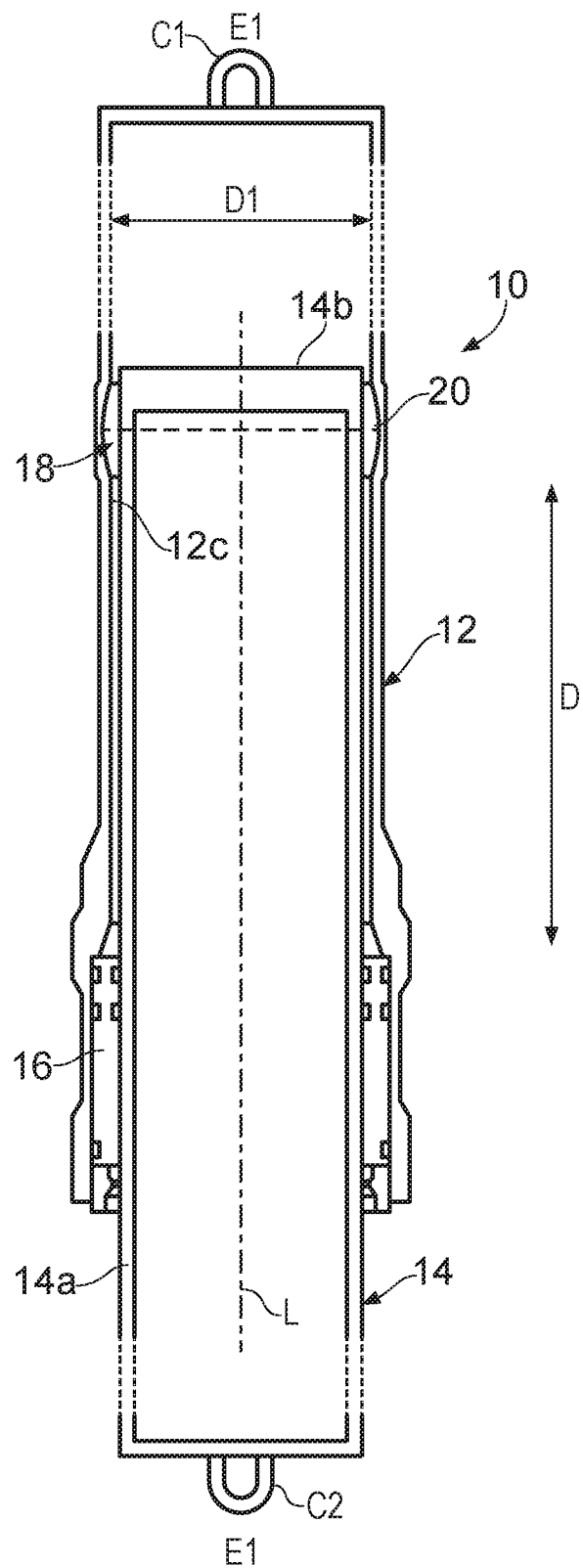
FIG. 3 is diagram of part of a telescopic device according to an embodiment of the invention.

FIG. 3 is a diagram of a telescopic device 10 according to an embodiment of the invention. In this embodiment the telescopic device 10 forms part of an aircraft (not shown), more specifically a shock absorbing strut 10 of an aircraft landing gear assembly (not shown). As such, the telescopic device of FIG. 3 will be referred to as the 'shock absorber'.

The shock absorber 10 is similar to the telescopic device 200 of FIG. 2 and for brevity the following description will focus mainly on the differences.

The shock absorber 10 comprises a housing in the form of an outer cylinder 12 which can include a mounting bearing formation C1 by which it is arranged to be pivotally coupled to an aircraft (not shown) so as to define the landing gear main fitting. Alternatively, the shock absorber can form part of a capsule type shock absorbing strut where the shock absorber is mounted within an external main fitting. In both cases, the shock absorber 10 is the primary load bearing structure of the landing gear assembly, arranged to carry the weight of the aircraft when it is on the ground.

At one end E1, which corresponds to its upper end when in a deployed landing gear condition, the outer cylinder 12 is closed.

A rod in the form of a sliding piston and tube assembly 14 is slidably coupled within the outer cylinder 12 so as to be reversibly movable along the longitudinal axis L of the outer cylinder 12 between a first position, which corresponds to a contracted position for the shock absorber, and a second position, which corresponds to an extended condition of the shock absorber.

The sliding tube 14 has a cylindrical piston rod 14a which extends through a first, lower bearing and dynamic seal assembly 16 mounted at the second, open, end of the outer cylinder 12. The internal end of the sliding tube 14 which resides within the bore of the outer cylinder 12 defines a piston head 14b which in this embodiment has the same diameter D1 as the piston rod 14a to enable the rod 14 to be inserted 'head first' past a second bearing 18.

The free end of the sliding tube can include or be fitted with a second coupling formation C2 for pivotally coupling to a bogie beam for example, or carrying an axle for mounting one or more wheel and brake assemblies.

The second, upper, bearing 18 is an inward facing bearing mounted on the inner side wall 12c of the outer cylinder 12 at a distance D from the first bearing 16 sufficient to enable the shock absorber 10 to extend and contract fully with the piston rod 14a supported by the second bearing 18.

Figure 4:
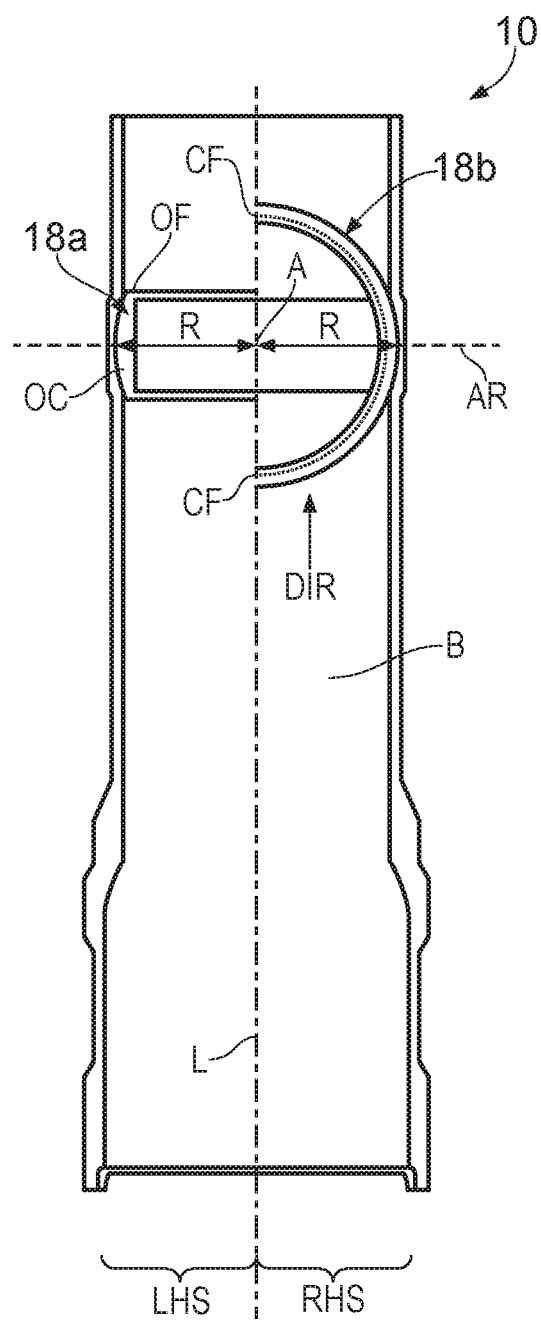
FIG. 4 is a diagram of the housing of the telescopic device of FIG. 3, illustrating how the two part upper bearing can be installed.

Referring additionally to FIG. 4, in contrast to the telescopic device 200 of FIG. 2, a telescopic device according to an embodiment of the invention includes a second bearing 18 mounted within an arcuate cross section annular groove 20 formed into the inner side wall 12c of the housing 12.

The annular groove 20 has an arcuate cross section when viewed in cross section parallel to the longitudinal axis L and when viewed in cross section orthogonal to the longitudinal axis L. Thus, the annular groove 20 defines a bearing mounting face of radius R in both circumferential and radial cross section.

Likewise, the outer circumferential surface OC of each bearing half 18a, 18b defines an arc of radius R in both circumferential and radial cross section.

Thus, both the recessed mounting surface of the annular groove 20 and the outer surface of the second bearing 18 are shaped like a central slice of a sphere of radius R.

In the illustrated embodiment the radius R of the bearing mounting surface is equal to the radius R of the annular groove mounting surface, but in other embodiments, one can be slightly smaller than the other. Making the bearing radius smaller than the groove radius can reduce wear in situations where the internal end region of the rod flexes in due to lateral loads applied to the free end of the rod. Making the bearing radius larger than the groove radius can provide a more secure, interference fit between the two parts. In some embodiments the circumferential radius of the bearing and/or groove can be smaller or larger than the cross sectional radius.

The outer circumferential surface OC of the second bearing 18 can be provided with a low friction, self-lubricating coating or liner such as KAron™ by Kamatics Corporation to reduce wear between the bearing 18 and casing 12.

The inner, bearing face of the bearing 18, which in use is in engagement with the sliding rod 14, can be formed from a variety of known bearing materials. The bearing face can be formed from metal such as aluminum or aluminum bronze. Alternatively bearing face can be formed from polymer such an epoxy containing particles of dry lubricant, such as graphite and/or PTFE fibers. The bearing 18 can be formed from such materials in its entirety, or can be formed from one or more bearing carriers which together define one or more annular grooves to mount one or more relatively low friction bearing rings to define the bearing face. Alternatively, the bearing carrier(s) can have low friction liners as described above provided on both wearing surfaces.

As illustrated to the right hand side RHS of FIG. 4, the second bearing 18 can be installed by positioning it so that its axis A is generally orthogonal to the longitudinal axis L. It can then be moved into the bore B in the direction SIR without contacting the casing sidewall 18c. As the first bearing half 18a reaches the annular groove 20, it can be rotated 90° about an axis of rotation AR which is orthogonal to the longitudinal axis L so as to place it within the annular groove 20.

In the illustrated embodiment the second bearing 18 is a two part bearing, formed as first bearing half 18a and a second bearing half 18b. Each bearing half 18a, 18b is 'C' shaped and has a pair of contact faces CF arranged to contact the contact faces CF of the other bearing half when the bearing 18 is completed to form a ring and situated in the annular groove 20.

The second bearing half 18b can be installed in a similar manner, except that as the leading contact face CF of the second bearing half 18b approaches situated first bearing half 18a, it can be rotated slightly about its axis A to allow the leading contact face CF to move beyond the first bearing half 18a. It can then be counter rotated so that when it is aligned with the annular groove 20 the contact faces CF are aligned with the longitudinal axis L and the contact faces CF of the first bearing half 18a. The second bearing can then be rotated 90° about the axis of rotation AR to places the contact faces CF in contact with one another.

The rod 12 can then be inserted through the bearing 18 to retain the bearing 18 in the annular groove 20.

Although the second bearing 18 of the illustrated example is formed from two parts, it can in other embodiments be formed as a single part from a material that is capable of flexing sufficiently in a radial direction to insert the bearing into the bore B and it will 'snap' into place in the annular groove 20. However, a two part bearing is advantageous when the second bearing 18 is formed from a material which is not suitable for such radial flexing.

A telescopic device according to embodiments of the invention has one or more of the following advantages.

Firstly, the second bearing can in use rotate about axes which are orthogonal to the longitudinal axis L to accommodate flexure of the sliding tube 14. This can reduce bearing and/or sliding tube wear in comparison to known arrangements.

Secondly, the annular groove 20 provides a simple, elegant way of retaining the second bearing 18 in place and can reduce stress raisers in the casing 12 in comparison to known arrangements in which an upper/second bearing is retained by way of a rectangular profile annular groove, or is coupled to the inner sidewall of the casing by way of mating engagement features.

In comparison to known arrangements where an upper bearing is mounted on a spacer or collar in the annulus, the annular groove 20 can provide a similar, lighter arrangement.

Although the telescopic device of FIG. 3 has been described with reference to a landing gear shock absorber, a telescopic device according to embodiments of the invention can be applied to various assemblies such as vehicles, robots, industrial machinery and the like.

Figure 5:
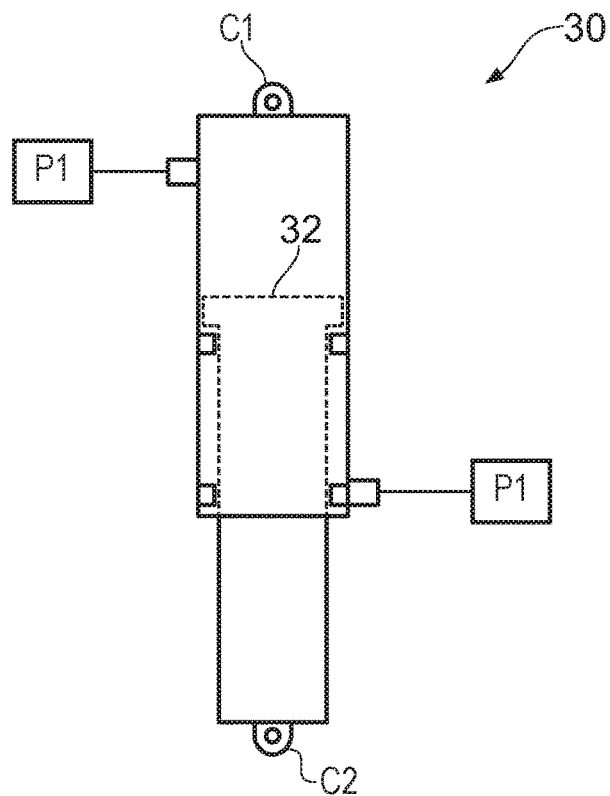
FIG. 5 is diagram of part of a telescopic device according to a further embodiment of the invention.

FIG. 5 shows a telescopic device 30 which is similar to the telescopic device 10 of FIG. 3, except that instead of being a shock absorber it is an actuator. In this embodiment the actuator 30 is a double acting actuator driven to extend by dominant pressure from source P1 on one side of the piston 32 and driven to retract by dominant pressure from source P2 on the other side of the piston 32. In other embodiments the actuator 30 can be single acting, multi acting or center seeking. In other embodiments an active telescopic device 30 can be electromechanically driven.

Figure 6:
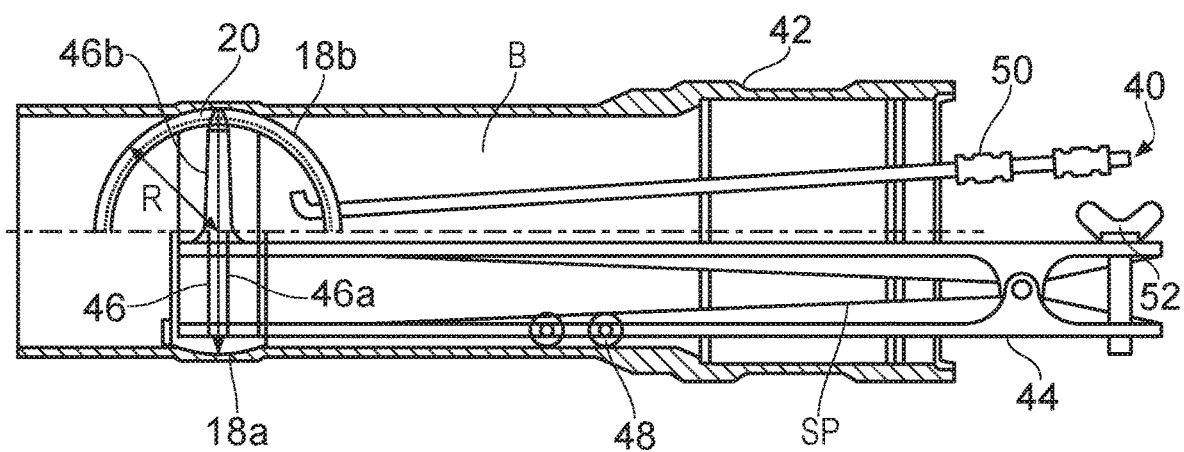
FIG. 6 is a schematic cross section view of an aircraft landing gear according to an embodiment of the invention.

FIG. 6 shows a tool 40 that can be used to insert a two part second bearing into a long bore in a casing 42. A pair of tongs 44 has ends arranged to hold a lateral lance 46 which has a first portion 46a of constant outer diameter so as to define a rod and a second portion 46b which has a radially enlarged, mushroom like formation which sits outside of the tong arms 44. As such, the tongs 44 can be used to control the orientation of the lance 46. The free end of the rod like portion 46a is, in use, inserted into a recess or other mounting formation on the inner, bearing face of the first half 18a of the second bearing 18. The second half 18b of the second bearing 18 also has a recess at its central region. The tip of the mushroom like portion of the lance 46b is inserted into the recess on the second bearing half 18b to carry it. The tongs can then be inserted into and along the bore to position bearing halves 18a, 18b at the annular groove 20. The tongs 44 can be biased apart by a spring SP and can be provided with adjustment means 52 to govern end separation and/or wheels 48 to aid with insertion. An elongate manipulation rod 50 can be used to grasp and manipulate the orientation of the second bearing half 18b as it approaches the annular recess and thereafter turn the second bearing half 18b through 90° to situate the bearing 18 in the annular recess 20. The tongs can then be pinched and withdrawn.

Embodiments of the invention therefore extend to a method of manufacturing a telescopic device comprising: providing a housing having an inner side wall surface defining a bore with an open end, the inner sidewall being provided with an annular groove having a second mounting surface of arcuate cross-section for mounting a second bearing relatively far from the open end of the bore relative to a first bearing; providing a second bearing; inserting the second bearing into the bore, the second bearing being annular in shape with a central axis, the bearing having a radially outer mounting surface of arcuate cross-section and a radially inner bearing surface for sliding engagement with an outer surface of a rod; moving the second bearing to situate the second bearing in the annular groove; and inserting an end of the rod through the second bearing.

Telescopic devices, shock absorbers and landing gear assemblies according to embodiments of the invention can be formed of conventional aerospace materials, such as stainless steel, aluminum or titanium.

Landing gear assemblies according to embodiments of the invention can be main landing gear assemblies or nose gear assemblies.

Although the invention has been described above with reference to one or more preferred embodiments, it will be appreciated that various changes or modifications can be made without departing from the scope of the invention as defined in the appended claims. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage.

The invention claimed is:

1. A telescopic device comprising:
a housing comprising a single unitary member having an inner side wall surface defining a bore with an open end;
a rod having an end slidably mounted within the bore to linearly move relative to the housing along a longitudinal axis between an extended position, where the telescopic device is relatively long, and a retracted position, where the telescopic device is relatively short; and
a first bearing and a second bearing each defining a respective bearing surface arranged to provide sliding engagement between the rod and the housing, the first bearing being mounted to the single unitary member relatively close to the open end of the bore and the second bearing being mounted to the single unitary member relatively far from the open end of the bore relative to the first bearing,
wherein the second bearing is annular in shape with a central axis and has a radially outer bearing mounting surface of arcuate cross-section and a radially inner bearing surface for sliding engagement with an outer surface of the rod and wherein the inner sidewall surface of the single unitary member is provided with an annular groove defining a groove mounting surface of arcuate cross-section to house and retain the second bearing; and
wherein a diameter of the inner side wall of the housing between the first bearing and the second bearing is less than an outer diameter of the outer bearing surface of the arcuate cross-section of the second bearing.

2. The telescopic device according to claim 1, wherein the annular groove and/or mounting surfaces each have an arcuate radial cross section and circumferential cross section of equal radius.

3. The telescopic device according to claim 1, wherein the second bearing is formed from two discrete C shaped parts.

4. The telescopic device according to claim 1, wherein the second bearing is formed from one or more body portions each arranged to carry one or more bearing ring portions on a radially inner face to define the second bearing surface.

5. The telescopic device according to claim 1, wherein the bearing mounting surface of the second bearing is defined by a layer of first material having a lower coefficient of friction in comparison to the coefficient of friction of a second material from which another part of the second bearing is formed.

6. The telescopic device according to claim 5, wherein the majority of the second bearing is formed from the second material.

7. The telescopic device according to claim 1, wherein the inner side wall surface of the housing is formed from a material which is softer than the material from which a majority of the rod is formed from.

8. The telescopic device according to claim 1, wherein the inner side wall surface of the housing is formed from bare titanium or aluminum.

9. The telescopic device according to claim 1, wherein the housing and the sliding rod cooperate, optionally via one or more seals, to define a substantially sealed chamber within the bore.

10. The telescopic device according to claim 1, wherein the telescopic device includes one or more control ports arranged to be coupled to sources of control fluid to extend and compress the telescopic device.

11. A vehicle assembly including a telescopic device according to claim 1.

12. An aircraft assembly comprising the vehicle assembly of claim 11.

13. The aircraft assembly of claim 12, wherein the aircraft assembly comprises an aircraft landing gear assembly.

14. A method of manufacturing a telescopic device, the method comprising:
providing a housing comprising a single unitary member having an inner side wall surface defining a bore with an open end, the inner sidewall being provided with an annular groove having a second mounting surface of arcuate cross-section for mounting a second bearing relatively far from the open end of the bore relative to a first bearing mounted to the single unitary member, wherein a diameter of the inner side wall of the housing between the first bearing and the second bearing is less than an outer diameter of the outer bearing surface of the arcuate cross-section of the second bearing;
providing a second bearing;
inserting the second bearing into the bore, the second bearing being annular in shape with a central axis, the bearing having a radially outer mounting surface of arcuate cross-section and a radially inner bearing surface for sliding engagement with an outer surface of a rod;
moving the second bearing to situate the second bearing in the annular groove; and
inserting an end of the rod through the second bearing.

15. The method of manufacturing a telescopic device according to claim 14, wherein:
the step of providing a second bearing comprises providing a second bearing which is formed from two discrete C shaped halves; and
the step of moving the second bearing comprises moving and situating one bearing half into the annular groove and moving the other bearing half into the bore at an angle such that the axis of the other bearing half is non parallel with respect to the longitudinal axis of the bore until the other bearing half reaches the annular groove and then rotating the other bearing half until its axis is generally parallel with respect to the longitudinal axis of the bore such that the second bearing is situated in the annular groove.

16. The method of manufacturing a telescopic device according to claim 15, wherein the step of moving the second bearing further comprises tilting the other bearing half to allow it to move past the first bearing half to reach the annular groove.

17. The telescopic device according to claim 1, wherein the annular groove defining the groove mounting surface of arcuate cross-section to house and retain the second bearing is formed directly into the housing.

18. The telescopic device according to claim 1, wherein the second bearing is mounted in direct sliding contact with the housing.

19. The telescopic device according to claim 1, wherein the annular groove defining the groove mounting surface of arcuate cross-section is located between adjacent cylindrical portions of the bore.

20. The telescopic device according to claim 19, wherein the radially outer bearing mounting surface of arcuate cross-section has a larger outer diameter than a respective inner diameter of each of the adjacent cylindrical portions of the bore.

21. The telescopic device of claim 1, wherein the annular groove comprises a region of the single unitary member having an enlarged diameter, the enlarged diameter being greater than the diameter of the inner side wall of the housing between the first bearing and the second bearing.

\* \* \* \* \*